Patented Sept. 24, 1940

2,215,727

UNITED STATES PATENT OFFICE 2,215,727

STEROL COMPOUNDS AND METHOD OF PRODUCING THEM

Hans R. Rosenberg, Wilmington, Del., and John M. Tinker, Penns Grove, N. J., assignors to E. I. du Pont de Nemours & Company, Wilmington, Del., a corporation of Delaware No Drawing. Application September 2, 1938, Serial No. 228,220

23 Claims. (Cl. 260—397)

This invention relates to the preparation of new organic chemical compounds, more particularly it relates to the preparation of mono-benzoic acid esters of steroids which have a double bond in the 5-6 position, and a hydroxy group in 3 position of the cyclo-pentano-perhydro-phenanthrene ring system. Still more particularly, it relates to the preparation of 7-hydroxy-cholesteryl-3-monobenzoate and esters thereof. The invention also relates to an improved method for preparing Δ 5,7-steroid compounds.

The chemical compounds 7-dehydro-cholesterol, 7-dehydro-sitosterol and 7-dehydro-stigmasterol, are well known and valuable provitamin D substances; 7-dehydro-cholesterol, e. g., has been prepared according to the prior art (U. S. Patent 2,098,984) by oxidizing cholesteryl acetate with chromic acid to obtain the 7-oxo-cholesteryl-acetate. This is in turn reduced by aluminum isopropylate, for instance, to yield the 7-hydroxyl compound, but in the reduction step, the acetyl group in the 3-position is simultaneously hydrolyzed and 7-hydroxy-cholesterol is formed. The hydroxy group has to be again esterified to form a diester. According to the patent above described, the 7-hydroxy cholesterol is benzoylated to form 7-hydroxy cholesteryl dibenzoate which may be subsequently converted into the 7-dehydro cholesteryl benzoate-3. Upon saponifying the latter substance, the 7-dehydro cholesterol is obtained.

This invention has for an object the development of an improved process for the preparation of 7-dehydrosterols which overcomes some of the disadvantages of the aforesaid process. A further object is the preparation of the 3-monobenzoate of 7-hydroxy-sterols, e. g. 7-hydroxy-cholesterol. A still further object is the preparation of the benzoic acid ester of aforesaid compounds and of mixed diesters of 3,7-dihydroxy sterols. Still other objects will appear hereinafter.

We have discovered that it is highly advantageous to use as a starting material in the preparation of 7-dehydro sterols the benzoates, e. g. cholesteryl-benzoate, instead of the acetate for the reason that in the reduction by means of mild reducing agents the ester group, namely, the benzoate, is not saponified. This circumstance is of great importance since it leads to more easy crystallization of the reaction products from the reduction, with a saving of time and effort. Furthermore, in the succeeding benzoylation only one hydroxyl group has to be esterified, rather than two, to obtain the dibenzoate. Thus, a material saving of reactants is effected. The yields are furthermore surprisingly greater, for instance, more than 10% better yields on the di-ester are obtained when using the 7-oxo-cholesteryl-benzoate instead of the acetate.

In developing our process, we have discovered two new intermediate compounds which are of great value in the art, namely, 7-oxo-cholesteryl-3-benzoates, which are obtained following the oxidation step and 7-hydroxy-cholesteryl-3-mono-benzoates which result from the reduction step. The last-mentioned compounds are of primary importance and may be used for the preparation of mixed esters which represent an entirely new class of compounds which were not available before. The aliphatic carboxylic acid esters are of particular importance among which, we have found the acetyl ester to be especially valuable new compounds.

The above and other objects may be accomplished according to this invention by oxidizing a 3-steryl-benzoate to a 7-oxo-steryl benzoate and reducing the same to a 7-hydroxy-steryl-3-monobenzoate. The esters of this compound may then be made by an esterification reaction.

The invention may be further understood but is not intended to be limited by the following examples:

Example I

Sixty-nine grams of cholesteryl-benzoate are dissolved in a mixture of 800 cc. carbon-tetrachloride and 2500 cc. glacial acetic acid. A solution of 43 g. chromic acid in 30 cc. of water and 30 cc. of glacial acetic acid is dropped into the solution of cholesteryl-benzoate. The reaction is carried out at 55° C. with stirring. After complete addition of the chromic acid the solution is stirred further for two hours at 55° C. The excess of chromic acid is then destroyed by the addition of a small amount of ethyl alcohol. Acetic acid and carbon tetrachloride are distilled off and a small amount of water is added. After cooling down to room temperature, crystals of 7-oxo-cholesteryl-benzoate separate which are isolated by filtration. Seventeen grams of 7-oxo-cholesteryl-benzoate are so obtained which corresponds to a yield of about 24% of theory. Further amounts can be isolated from the mother liquors which can be recrystallized from ether and alcohol. 7-oxo-cholesteryl-benzoate melts at 158—160° C. to a cloudy liquid which becomes clear at 180° C.

Fifty grams of 7-oxo-cholesteryl-benzoate are dissolved in isopropanol and aluminum isopropylate is added. After boiling for about 5 hours the isopropanol and the acetone formed during the reaction are distilled off and the residue extracted with ether and water. The ether solution contains the 7-hydroxy-cholesteryl-3-monobenzoate which crystallized out by distilling off the ether. It can be recrystallized from ether and alcohol. It melts at 192° C.

For transforming the 7-hydroxy-cholesteryl-3-mono-benzoate into the dibenzoate it is dissolved in pyridine and benzoyl chloride is added while cooling. The 7-hydroxy-cholesteryl-dibenzoate which is formed melts at 172.5—173.5° C. as described in U. S. Patent 2,098,984.

*Example II*

Three hundred grams of cholesteryl-benzoate are oxidized in a mixture of 1800 cc. carbon-tetrachloride and 5000 cc. glacial acetic acid by means of chromic anhydride to 7-oxo-cholesteryl-benzoate. Melting point 158—160—180° C. One hundred grams of 7-oxo-cholesteryl-benzoate are dissolved in 1000 cc. of hot isopropyl alcohol and 50 g. of liquefied aluminum isopropylate are added and the mixture boiled for 4 hours under reflux. After the reduction is complete the yellow-green fluorescent solution is diluted with ether and freed from aluminum by washing with diluted hydrochloric acid. The colorless ether extract is evaporated after drying and the residue recrystallized from ether alcohol. The obtained 7-hydroxy-cholesteryl-3-mono-benzoate melts at 184—192° C.

Seven-hydroxy-cholesteryl-3-benzoate-7-acetate is obtained by acetylation of 7-hydroxy-cholesteryl-3-mono-benzoate with acetic anhydride in pyridine. After standing for 12 hours at room temperature or after boiling for 30 minutes the reaction product is obtained by distilling to dryness and recrystallizing from alcohol. The melting point of 7-hydroxy-cholesteryl-3-benzoate-7-acetate is 149—150° C.

*Note.*—All melting points were made in a Berl block by using a standardized thermometer. The melting points, however, were not corrected. They were taken in an open glass tube.

Acetyl chloride and acetic acid may be used with similar results. Other esterifying agents such as propionic, butyric, palmitic, substituted-benzoic, naphthalenic acids, anhydrides and chlorides may be substituted to form other mixed esters.

In place of the chromic acid and chromic anhydrides of the preceding examples, any agent which converts a methylene group attached to a carbon-carbon double bond into a keto group may be used. As further examples of such agents, mention is made of selenium dioxide alone or in the presence of iodine, etc. Any solvent or mixture of solvents which dissolves the reaction components may be used during this stage of the process.

The above examples illustrate the invention only as it is applied to the use of cholesteryl benzoate, but we wish it to be understood that the invention is not so limited. Thus, it may be applied to other steryl benzoates such as sitosteryl-benzoate, stigmasteryl-benzoate, etc. In fact, any benzoate of a sterol characterized by having a double bond in the 5—6 position and a hydroxy group in 3-position of the cyclopentano-perhydro-phenanthrene skeleton may be similarly used.

Although only the benzoate of cholesterol is mentioned in the examples, substituted benzoic acid esters may be used, such as the mono- and di-nitro-benzoates. The benzoic acid ring may be substituted by non-functional substituents including halogen, e. g. chlorine, bromine; alkoxy, e. g., methoxy, ethoxy; alkyl, e. g. ethyl, methyl, isopropyl, butyl and other straight and branched chain normal and iso alkyl groups; aryl, e. g. phenyl, chlorphenyl, tolyl, naphthyl and aralkyl, e. g. benzyl. Naphthalenic acid esters may also be used. The corresponding esters of steroids characterized by having double bond in the 5—6 position and a hydroxy group in 3-position of the cyclopentano-perhydro-phenanthrene skeleton may be similarly used.

In place of the aluminum isopropylate of the examples, other mild reducing agents may be used. The metal alcoholates are preferred, however. Thus, aluminum methylates, ethylate, propylate, isobutylate and isoamylate may be used. Also, the corresponding alcoholates of other metals taken from the group consisting of the earth metals, zirconium and magnesium, may be resorted to. The alcohols corresponding to the alcoholates may be used as diluents. Mixtures of the aforementioned agents and solvents may be used. Any dry organic solvent may be used during this stage of the process, such as hydrocarbons, e. g. benzene, ethers, alcohols, and mixtures thereof. Preferably the same alcohol as present in the metal alcoholate is used. A mixture of benzene with isopropanol, for instance, is very useful.

The esterification of the 7-hydroxy group may be carried out by one of the usual processes, for instance, by means of benzoyl chloride, acetyl chloride, acetic anhydride, etc. The esterification is advantageously carried out in the presence of an organic base, e. g. pyridine, piperidine, piperazine, aniline, dimethyl aniline, diethyl-α-naphthylamine, dimethyl-stearyl-amine, morpholine, triethylamine, alkylolamines, etc. The bases also act as solvent mediums.

This is especially advantageous for the production of Provitamin D on a commercial scale since the reaction product 7-hydroxy-cholesteryl-3-mono-benzoate is a substance which crystallizes easily, whereas the 7-hydroxy-cholesterol used in prior processes is very difficult to crystallize and can only be obtained in a crystalline form when pure. A further advantage resides in the fact that yields which are 10% greater than the prior acetate process are obtained. A still further advantage resides in the fact that conversion into the 7-hydroxyl-cholesteryl-dibenzoate requires only half the amount of esterifying agent, i. e. benzoyl than when using 7-hydroxy-cholesteryl. A still further advantage resides in the fact that the 7-hydroxy-cholesteryl 3-mono-benzoates, etc. are valuable for the production of mixed esters, e. g. 7-hydroxy-cholesteryl-3-benzoate-7-acetate, which esters may be used for conversion into 7-dehydro-sterol esters.

As many apparently widely different embodiments of this invention may be made without departing from the spirit and scope thereof, it is to be understood that we do not limit ourselves to the specific embodiments hereof except as defined by the appended claims.

We claim:

1. A process which comprises oxidizing an aromatic ester of a sterol having a hydroxyl group in 3-position and a double bond in the 5—6 position of the cyclopentano-perhydro-phenanthrene nucleus, reducing the corresponding 7-oxo-ester to the 7-hydroxy-3-mono ester and converting the latter into a diester.

2. A process which comprises oxidizing an aromatic ester of a sterol having a hydroxyl group in 3-position and a double bond in the 5—6 position of the cyclopentano-perhydro-phenanthrene nucleus, reducing the corresponding 7-oxo-ester to the 7-hydroxy-3-mono ester and converting the latter to a mixed diester.

3. A process which comprises oxidizing a 3-benzoic acid ester of a sterol having a hydroxy group in 3-position and a double bond in the 5—6 position of the cyclopentano perhydrophenanthrene nucleus, reducing the corresponding 7-oxo-benzoic acid ester and esterifying the latter with a carboxylic acid esterifying agent.

4. A process which comprises oxidizing a 3-benzoic acid ester of a sterol having a hydroxy group in 3-position and a double bond in the 5—6 position of the cyclopentano perhydrophenanthrene nucleus, reducing the corresponding 7-oxo-benzoic acid ester and esterifying the latter with a different carboxylic acid esterifying agent.

5. A process which comprises oxidizing a cholesteryl benzoate to 7-oxo-cholesteryl-3-benzoate, reducing the latter to 7-hydroxy-cholesteryl-3-benzoate and esterifying the latter with a carboxylic acid esterifying agent.

6. As new products the 7-oxo-steryl-3-mono-aromatic carboxylic acid esters.

7. As new compounds the 7-oxo-steryl-3-mono-benzoates.

8. As new compounds the 7-oxo-cholesteryl-benzoates.

9. As a new compound, 7-oxo-cholesteryl-benzoate.

10. As a new compound, 7-hydroxy-cholesteryl-3-benzoate.

11. A mixed ester of a 7-hydroxy-steryl-3-benzoate.

12. An aliphatic carboxylic acid ester of 7-hydroxy-cholesteryl-3-benzoate.

13. 7-Acetoxy-cholesteryl-3-benzoate.

14. A process which comprises reducing 7-oxo-steryl-benzoates to 7-hydroxy-steryl-3-benzoates and converting the latter to diesters.

15. A process as set forth in claim 1 wherein said aromatic ester is an aromatic mono-carboxylic acid ester.

16. A process as set forth in claim 3 wherein said carboxylic acid esterifying agent is an aliphatic carboxylic acid esterifying agent.

17. A process as set forth in claim 3 wherein said carboxylic acid esterifying agent is an acetylating agent.

18. A process as set forth in claim 5 wherein said esterifying agent is an acetylating agent.

19. A process as set forth in claim 5 wherein said esterifying agent is benzoyl chloride.

20. In a process of making a 7-acetoxy steryl benzoate, the step which comprises reacting a 7-hydroxy-steryl benzoate with an acetylating agent.

21. In a process of making a 7-acetoxy steryl benzoate, the step which comprises reacting a 7-hydroxy-steryl benzoate with acetic anhydride.

22. A process which comprises oxidizing a cholesteryl-benzoate to 7-oxo-cholesteryl-benzoate, reducing the latter to 7-hydroxy-cholesteryl-3-benzoate and esterifying the latter with a benzoylating agent.

23. A process which comprises oxidizing a cholesteryl-benzoate to 7-oxo-cholesteryl-benzoate, reducing the latter to 7-hydroxy-cholesteryl-3-benzoate and esterifying the latter with acetic anhydride.

HANS R. ROSENBERG.
JOHN M. TINKER.